J. Sykes,
Guide Mandrel for Wheelwrights,
Nº 13,142.
Patented June 26, 1855.
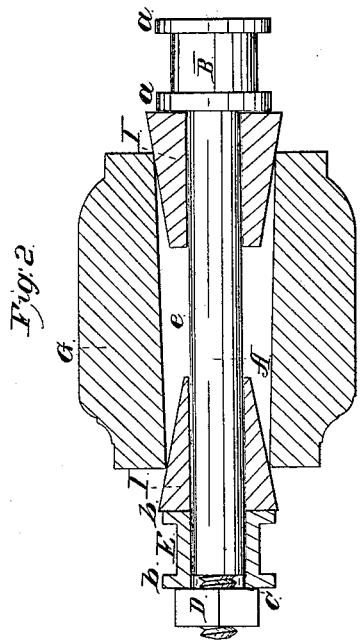
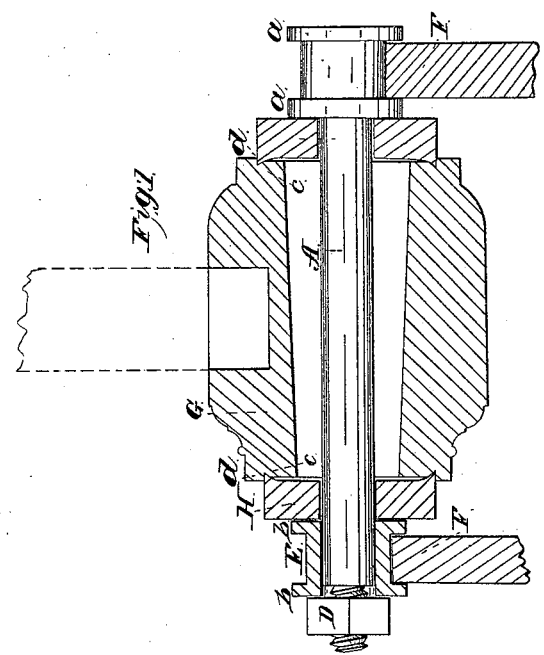

UNITED STATES PATENT OFFICE.

JOSEPH SYKES, OF MERCER, PENNSYLVANIA.

WHEELWRIGHT'S GUIDE-MANDREL.

Specification of Letters Patent No. 13,142, dated June 26, 1855.

*To all whom it may concern:*

Be it known that I, JOSEPH SYKES, of Mercer, in the county of Mercer and State of Pennsylvania, have invented a new and Improved Guide-Mandrel, on which Hubs are Secured for the Purpose of having the Spokes Driven in them Properly; and I do hereby declare that the following is a full, clear, and exact description of the same, reference being had to the annexed drawings, making a part of this specification, in which—

Figures 1 and 2 are longitudinal sections of my improvement.

Similar letters of reference indicate corresponding parts in the two figures.

The nature of my invention consists in the employment of a mandrel provided with a permanent and sliding journal and with cones or circular flanged plates arranged in the manner as will be presently shown, whereby the hubs of wheels may be properly adjusted so as to insure the spokes being driven in them in a proper manner.

To enable others skilled in the art to fully understand and construct my invention, I will proceed to describe it.

A, represents a mandrel, constructed of metal, and having a journal B, formed at one end, said journal being permanently attached to the mandrel, and having flanges or projections (a) (a) one at each end, as shown in both figures. The mandrel A, has a screw thread C, cut on one end, on which a nut D, works, and a collar E, is fitted loosely on the mandrel, said collar having a flange (b) at each end. This collar is of the same form as the journal B, and is the same in every respect with the exception, that it is loose upon the mandrel. It performs the office of a journal at the end of the mandrel opposite the journal B. The collar or journal E, and the journal B, are fitted in suitable bearings on a proper frame work F.

G, represents a hub which is placed upon the mandrel A, and H, H, are circular plates which are also placed upon the mandrel, one at each end of the hub see Fig. 1. In each end of the hub an annular V shaped recess (c) is cut when the hub is turned. The inner edges of the plates H, are provided with flanges (d) which fit in the recesses (c) the flanges being secured firmly in the recesses by screwing up the nut D, which causes the hub, plates, and collar or journal E, to be secured firmly and truly on the mandrel. The journals are allowed to turn freely on the bearings on the frame F, and the spokes, one of which is shown in red Fig. 1, are driven properly or truly in the hub, because it is truly centered on the mandrel, in consequence of the flanges (d) on the plates H, being fitted in the V shaped recesses (c).

In case of iron hubs, or those not provided with annular recesses (c), cones I, I, may be used instead of the plates H, H, see Fig. 2. The cones being fitted on the mandrel and forced into the ends of the taper hole (e) in the hub, by turning the nut D.

The mandrel A, may be sufficiently long to suit the largest hubs, or mandrels of different lengths may be employed.

By the above invention it will be seen that the hub may be truly centered on the mandrel, and adjusted thereon, and removed with the greatest facility.

What I claim as new and desire to secure by Letters Patent, is—

The combination of the mandrel A, with its permanent and loose journals B, E, and the circular plates H, H, or cones I, I, either plates or cones being used as circumstances require, the above parts being arranged as herein shown and for the purpose as set forth.

JOSEPH SYKES.

Witnesses:
WILLIAM R. McKIM,
JOHN R. HANNA.